United States Patent
Beaton et al.

(10) Patent No.: US 7,222,304 B2
(45) Date of Patent: *May 22, 2007

(54) MULTITASKING GRAPHICAL USER INTERFACE

(75) Inventors: Brian Finlay Beaton, Orleans (CA); Colin Donald Smith, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 700 days.

This patent is subject to a terminal disclaimer.

(21) Appl. No.: 10/629,558

(22) Filed: Jul. 30, 2003

(65) Prior Publication Data

US 2004/0021697 A1 Feb. 5, 2004

(51) Int. Cl.
*G06F 13/00* (2006.01)
*G06F 15/00* (2006.01)

(52) U.S. Cl. ............... 715/744; 715/810; 455/566

(58) Field of Classification Search ............ 715/762, 715/744, 751, 754, 853, 854, 811, 810; 455/566, 455/556

See application file for complete search history.

(56) References Cited

U.S. PATENT DOCUMENTS

| | | | |
|---|---|---|---|
| 5,465,401 A | 11/1995 | Thompson | |
| 5,715,524 A | 2/1998 | Jambhekar et al. | |
| 5,719,936 A | 2/1998 | Hillenmayer | |
| 5,754,636 A * | 5/1998 | Bayless et al. ......... | 379/142.1 |
| 5,838,775 A | 11/1998 | Montalbano | |
| 5,900,875 A | 5/1999 | Haitani | |
| 6,009,469 A | 12/1999 | Mattaway et al. | |
| 6,177,950 B1 | 1/2001 | Robb | |
| 6,321,158 B1 * | 11/2001 | DeLorme et al. ........... | 701/201 |

FOREIGN PATENT DOCUMENTS

| | | |
|---|---|---|
| EP | 063 0141 | 12/1994 |
| EP | 0651 544 | 3/1995 |
| EP | 0748 139 | 12/1996 |
| WO | WO 96/15490 | 5/1996 |
| WO | WO 96/31866 | 10/1996 |

OTHER PUBLICATIONS

"Nokia 9000 Communicator User's Manual," Nokia Corporation, 1996, pp. 1-1 through 16-1 (48 pages total).

* cited by examiner

*Primary Examiner*—Cao (Kevin) Nguyen
(74) *Attorney, Agent, or Firm*—Hunton & Williams LLP

(57) ABSTRACT

A telecommunications device permits a user to perform several communication related tasks concurrently. The telecommunications device includes a user input device, a display having a tools portion and a windows portion, and a processing element. The processing element includes an element configured to represent the communication related tasks as objects in the tools portion, an element configured to launch different ones of the communication related tasks based upon selection of corresponding ones of the communication related task objects by the user via the user input device, and an element configured to change the window portion based on the user selection without changing the tools portion.

32 Claims, 12 Drawing Sheets

MULTITASKING GRAPHICAL USER INTERFACE

RELATED APPLICATIONS

This application is related to U.S. patent application, Ser. No. 08/841,485; entitled ELECTRONIC BUSINESS CARDS; U.S. patent application, 08/841,486, entitled SCROLLING WITH AUTOMATIC COMPRESSION AND EXPANSION; U.S. patent application, Ser. No. 08/842,019, entitled CLID WITH LOCATION ICON; U.S. patent application, Ser. No. 08/842,107, entitled CLID WITH DRAG AND DROP CAPABILITY; U.S. patent application, Ser. No. 08/842,020, entitled INTEGRATED MESSAGE CENTER; and U.S. patent application, Ser. No. 08/842,036, entitled ICONIZED NAME LIST, all of which were filed concurrently herewith, and all of which are hereby incorporated by reference.

BACKGROUND OF THE INVENTION

This invention relates generally to the field of telecommunications equipment, and more specifically to the field of a multitasking graphical user interface for a telecommunications equipment that facilitates multiple communication related tasks to occur simultaneously while allowing a user to switch from task to task with ease.

Traditional communication systems, such as wireline telephones, cellular telephones, and personal digital assistants (PDAs), required a user to halt one communication-related task before proceeding to the next one. Although some of these communication systems offered limited multitasking by permitting voice communication concurrently with another communication related task, this operation prevented efficient multitasking by requiring that one of the communication related tasks be voice communication.

Another limitation of traditional cellular telephones that prevents efficient multitasking is the limited size of their displays and the use of text based and menu driven user interfaces. The inclusion of soft keys and scrolling lists have been insufficient to simplify user interaction to allow for efficient multitasking.

One conventional telephone uses menus to enable a user to interact with the system. Separate, distinct applications handle each type of communication task. For example, a fax application processes incoming and outgoing faxes, a Short Messaging Service (SMS) application handles incoming and outgoing short messages, and a telephone application handles incoming and outgoing voice calls. The telephone provides hard keys to enable the user to toggle between applications.

This type of telephone, however, suffers from a number of drawbacks. First, when a user presses one of the application hard keys, the corresponding application display completely overwrites the display, burying any opened application display. This technique does not allow the user to monitor the status of other opened applications, nor does it permit the user to see the interaction between applications.

Additionally, message handling is cumbersome because these telephones are menu driven and contain separate applications for different message types. To perform different types of communication tasks, the user must follow a series of menus that causes specific applications to be executed.

Therefore, a need exists to permit easy access to different communication tasks in a minimal number of steps while permitting the user to monitor the status of and toggle between communication tasks with ease.

SUMMARY OF THE INVENTION

Systems and methods consistent with the present invention address this need by providing a multitasking graphical user interface that gives a user quick access to all major communication tools so as to accomplish communication tasks in a minimal number of steps.

In accordance with the purpose of the invention as embodied and broadly described herein, the multitasking graphical user interface consistent with the principles of the present invention includes a telecommunications device that permits a user to perform several communication related tasks concurrently. The telecommunications device includes a user input device, a display having a tools portion and a windows portion, and a processing element. The processing element includes an element configured to represent the communication related tasks as objects in the tools portion, an element configured to launch different ones of the communication related tasks based upon selection of corresponding ones of the communication related task objects by the user via the user input device, and an element configured to change the window portion based on the user selection without changing the tools portion.

BRIEF DESCRIPTION OF THE DRAWINGS

The accompanying drawings, which are incorporated in and constitute a part of this specification, illustrate systems and methods consistent with this invention and, together with the description, explain the objects, advantages and principles of the invention. In the drawings.

DETAILED DESCRIPTION OF THE PREFERRED EMBODIMENTS

The following detailed description of the invention refers to the accompanying drawings that illustrate preferred embodiments consistent with the principles of this invention. Other embodiments are possible and changes may be made to the embodiments without departing from the spirit and scope of the invention. The following detailed description does not limit the invention. Instead, the scope of the invention is defined only by the appended claims.

The multitasking graphical user interface consistent with the principles of the present invention provides a user with quick access to all major communication tools from all main functional areas so as to accomplish communication tasks in a minimal number of steps.

I. System Architecture.

Figure 1:
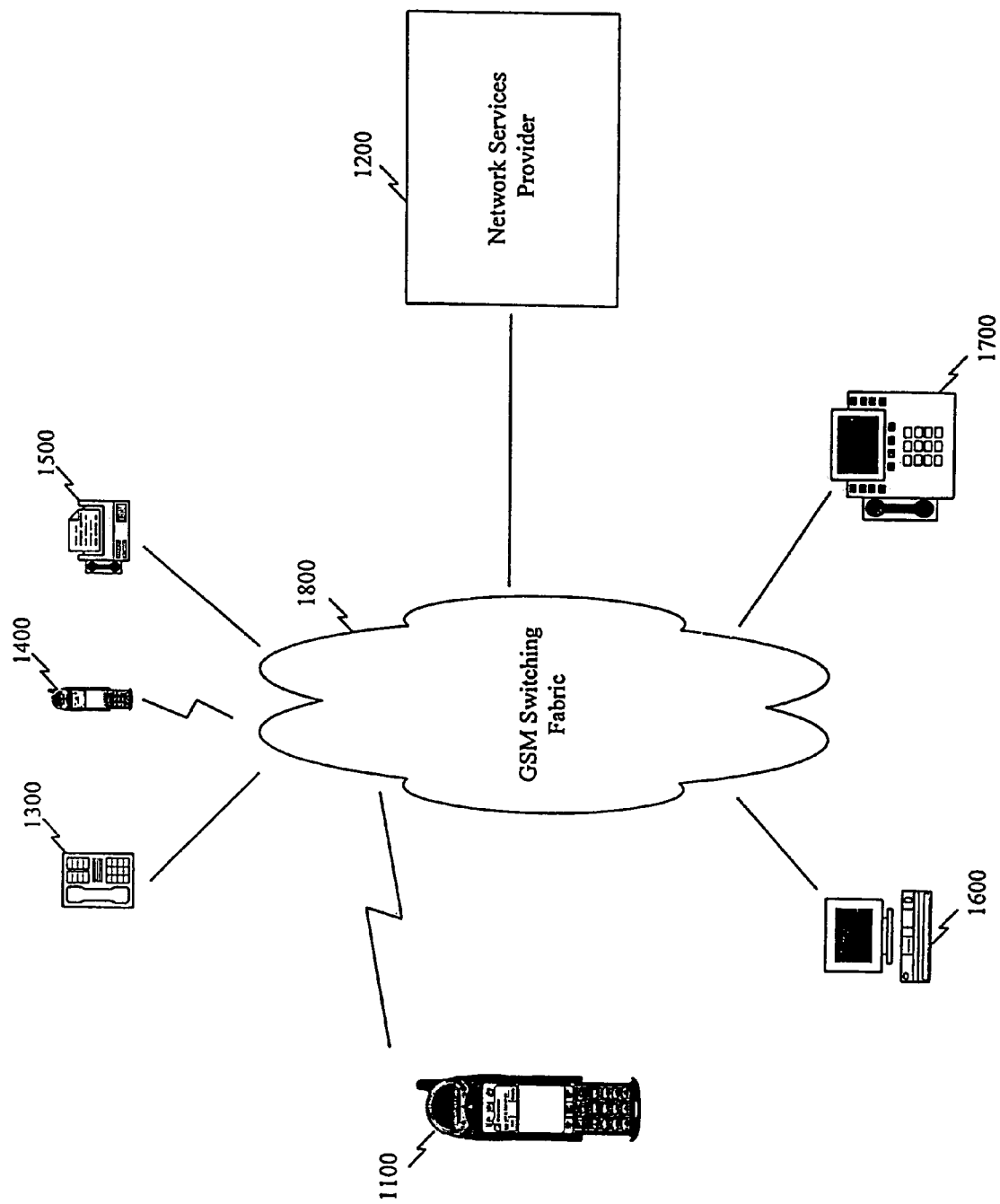
FIG. 1 is a block diagram of a communications network operating in conjunction with the multitasking graphical user interface consistent with the present invention.

FIG. 1 is a block diagram of a communications network containing mobile telephone 1100 having the multitasking graphical user interface consistent with the present invention. A user communicates with a variety of communication equipment, including external servers and databases, such as network services provider 1200, using mobile telephone 1100.

The user also uses mobile telephone 1100 to communicate with callers having different types of communication equipment, such as ordinary telephone 1300, caller mobile telephone 1400 which is similar to user mobile telephone 1100, facsimile equipment 1500, computer 1600, and Analog Display Services Interface (ADSI) telephone 1700. The user communicates with network services provider 1200 and caller communication equipment 1300 through 1700 over a communications network, such as Global System for Mobile Communications (GSM) switching fabric 1800.

While FIG. 1 shows caller communication equipment 1300 through 1700 directly connected to GSM switching fabric 1800, this is not typically the case. Telephone 1300, facsimile equipment 1500, computer 1600, and ADSI telephone 1700 normally connect to GSM switching fabric 1800 via another type of network, such as a Public Switched Telephone Network (PSTN).

The user communicates with a caller or network services provider 1200 by establishing either a voice call, a data call, or by sending an SMS message. GSM networks provide an error-free, guaranteed delivery transport mechanism by which callers can send short point-to-point messages, i.e., SMS messages, through the GSM network, such as GSM switching fabric 1800, in a GSM signaling channel, simultaneously with, or without, a voice or data call.

GSM protocol limits the length of SMS messages to a maximum of 140 bytes in length. However, GSM protocol permits longer messages to be formed by concatenating several messages together, transparent to the caller. Because GSM protocol transparently performs this concatenating of messages, the caller sees no restriction on message length.

Figure 2:
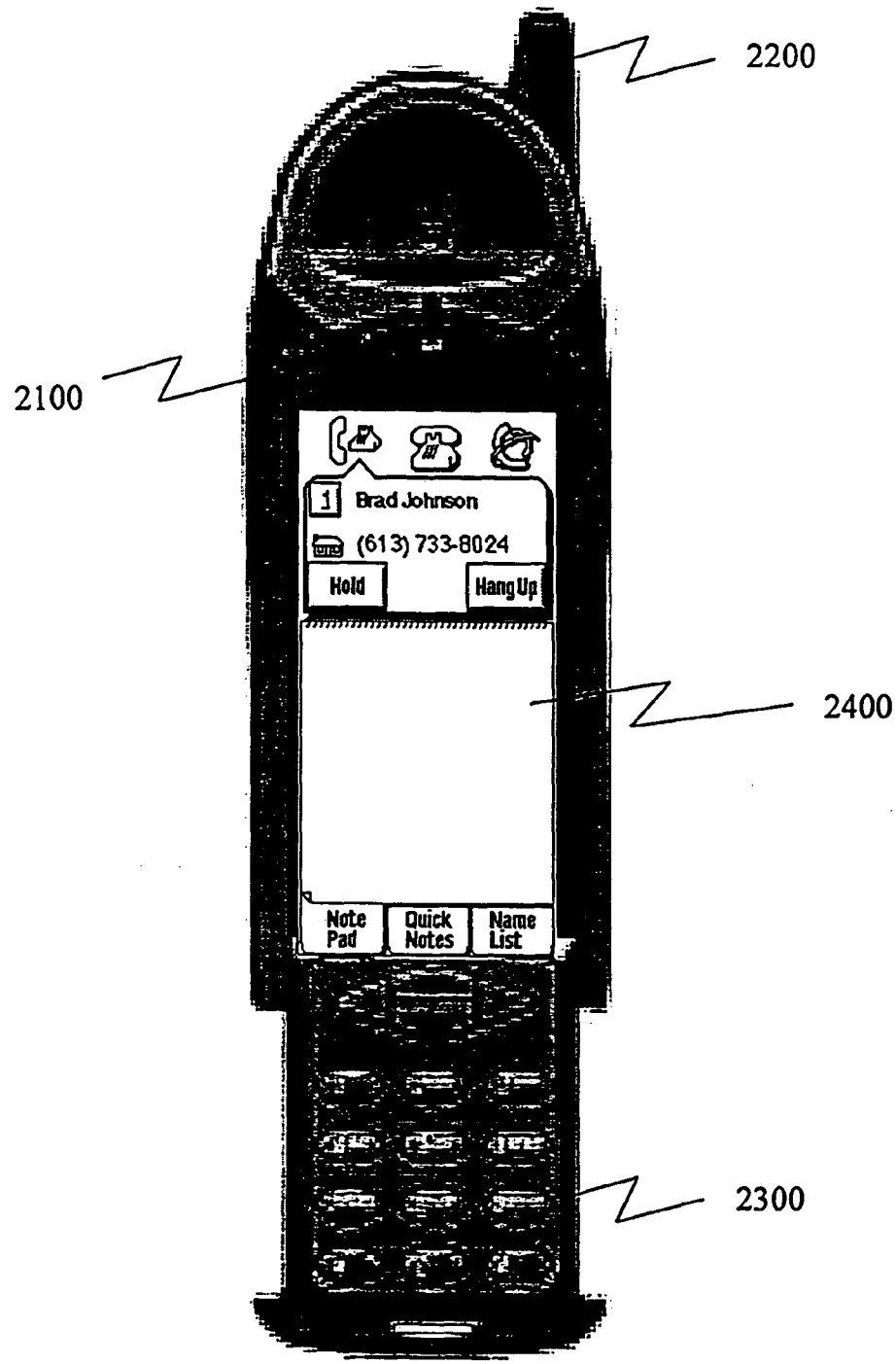
FIG. 2 is a diagram of a user mobile telephone operating in the network of FIG. 1.

Mobile telephone 1100 provides a user friendly interface to facilitate incoming and outgoing communication by the user. FIG. 2 is a diagram of mobile telephone 1100 that operates in the network shown in FIG. 1. Mobile telephone 1100 includes main housing 2100, antenna 2200, keypad 2300, and display 2400.

Figure 3:
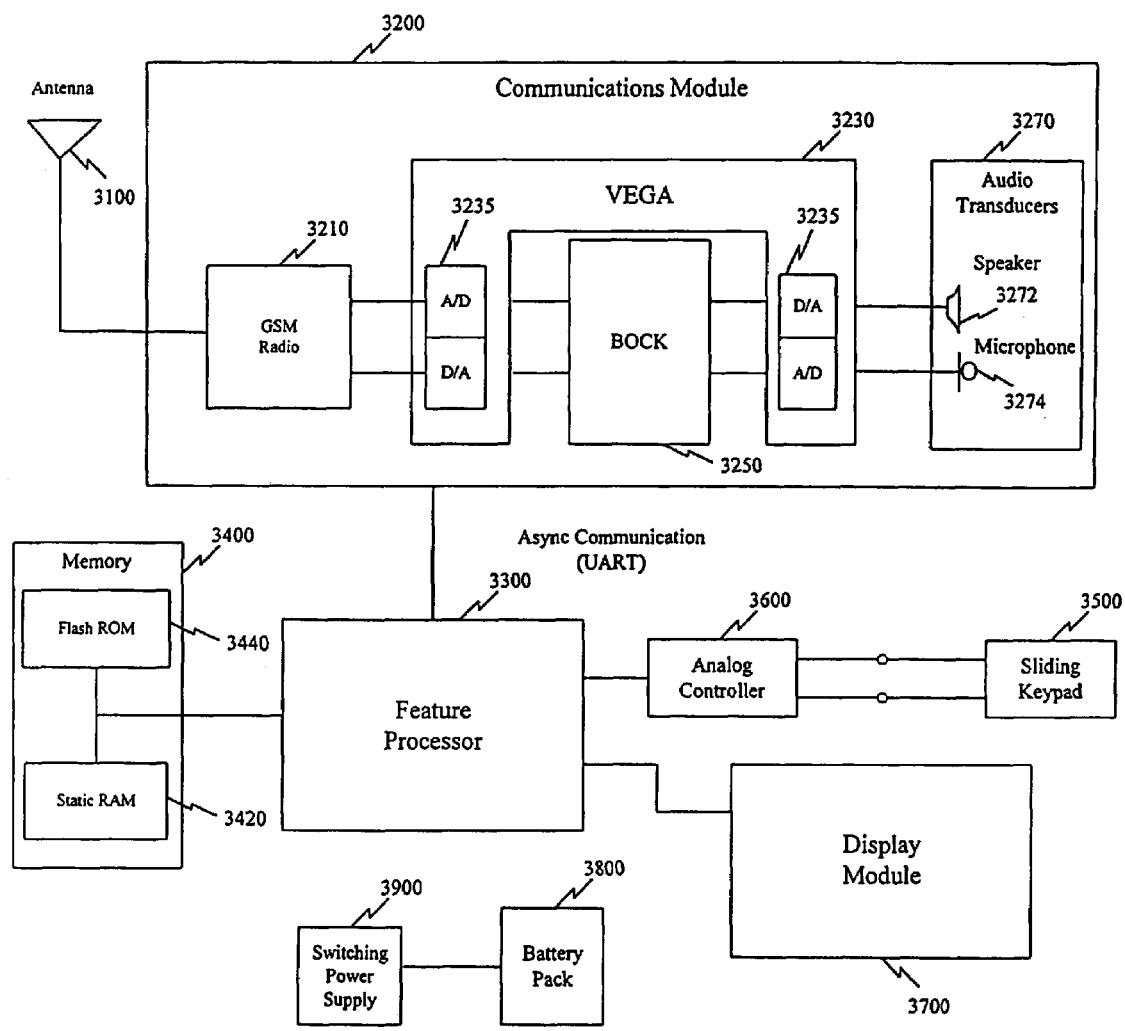
FIG. 3 is a block diagram of the elements included in the user mobile telephone of FIG. 2.

FIG. 3 is a block diagram of the hardware elements in mobile telephone 1100, including antenna 3100, communications module 3200, feature processor 3300, memory 3400, sliding keypad 3500, analog controller 3600, display module 3700, battery pack 3800, and switching power supply 3900.

Antenna 3100 transmits and receives radio frequency information for mobile telephone 1100. Antenna 3100 preferably comprises a planar inverted F antenna (PIFA)-type or a short stub—(2 to 4 cm) custom helix antenna. Antenna 3100 communicates over GSM switching fabric 1800 using a conventional voice B-channel, data B-channel, or GSM signaling channel connection.

Communications module 3200 connects to antenna 3100 and provides the GSM radio, baseband, and audio functionality for mobile telephone 1100. Communications module 3200 includes GSM radio 3210, VEGA 3230, BOCK 3250, and audio transducers 3270.

GSM radio 3210 converts the radio frequency information to/from the antenna into analog baseband information for presentation to VEGA 3230. VEGA 3230 is preferably a Texas Instruments VEGA device, containing analog-to-digital (A/D)/digital-to-analog (D/A) conversion units 3235. VEGA 3230 converts the analog baseband information from GSM radio 3210 to digital information for presentation to BOCK 3250.

BOCK 3250 is preferably a Texas Instruments BOCK device containing a conventional ARM microprocessor and a conventional LEAD DSP device. BOCK 3250 performs GSM baseband processing for generating digital audio signals and supporting GSM protocols. BOCK 3250 supplies the digital audio signals to VEGA 3230 for digital-to-analog conversion. VEGA 3230 applies the analog audio signals to audio transducers 3270. Audio transducers 3270 include speaker 3272 and microphone 3274 to facilitate audio communication by the user.

Feature processor 3300 provides graphical user interface features and a Java Virtual Machine (JVM). Feature processor 3300 communicates with BOCK 3250 using high level messaging over an asynchronous (UART) data link. Feature processor 3300 contains additional system circuitry, such as a liquid crystal display (LCD) controller, timers, UART and bus interfaces, and real time clock and system clock generators (not shown).

Memory 3400 stores data and program code used by feature processor 3300. Memory 3400 includes static RAM 3420 and flash ROM 3440. Static RAM 3420 is a volatile memory that stores data and other information used by feature processor 3300. Flash ROM 3440, on the other hand, is a non-volatile memory that stores the program code and directories utilized by feature processor 3300.

Sliding keypad 3500 enables the user to dial a telephone number, access remote databases and servers, and manipulate the graphical user interface features. Sliding keypad 3500 preferably includes a mylar resistive key matrix that generates analog resistive voltage in response to actions by the user. Sliding keypad 3500 preferably connects to main housing 2100 (FIG. 2) of mobile telephone 1100 through two mechanical "push pin"-type contacts.

Analog controller 3600 is preferably a Phillips UCB 1100 device that acts as an interface between feature processor 3300 and sliding keypad 3500. Analog controller 3600 converts the analog resistive voltage from sliding keypad 3500 to digital signals for presentation to feature processor 3300.

Display module 3700 is preferably a 160 by 320 pixel LCD with an analog touch screen overlay and an electroluminescent backlight. Display module 3700 operates in conjunction with feature processor 3300 to display the graphical user interface features.

Battery pack 3800 is preferably a single lithium-ion battery with active protection circuitry. Switching power supply 3900 ensures highly efficient use of the lithium-ion battery power by converting the voltage of the lithium-ion battery into stable voltages used by the other hardware elements of mobile telephone 1100.

Figure 4:
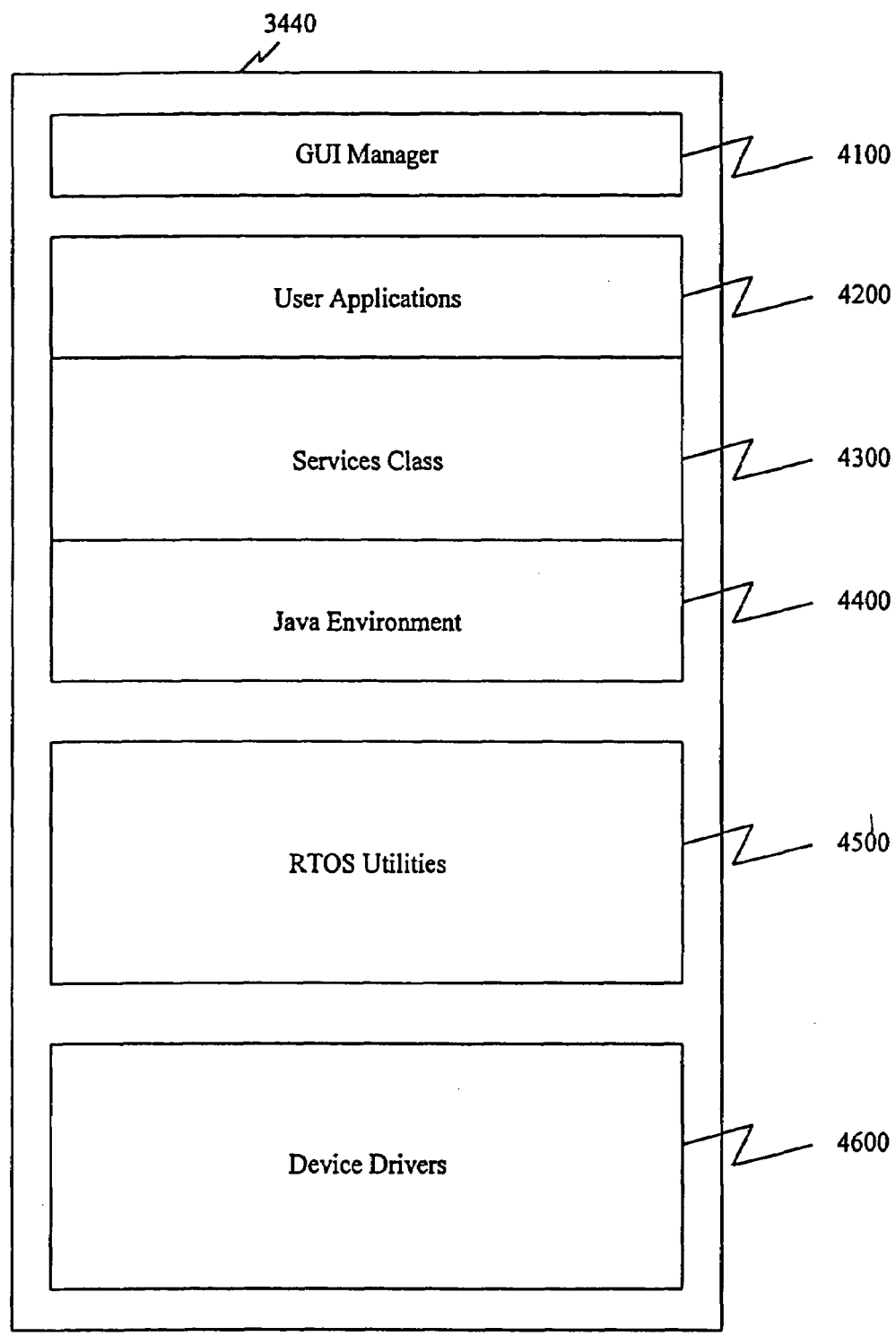
FIG. 4 is a block diagram of the software components stored in the flash ROM of FIG. 3.

FIG. 4 is a block diagram of the software components of flash ROM 3440, including graphical user interface (GUI) manager 4100, user applications 4200, service classes 4300, Java environment 4400, real time operating system (RTOS) utilities 4500, and device drivers 4600.

GUI manager 4100 acts as an application and window manager. GUI manager 4100 oversees the user interface by allowing the user to select, run, and otherwise manage applications.

User applications 4200 contain all the user-visible applications and network service applications. User applications

4200 preferably include a call processing application for processing incoming and outgoing voice calls, a message processing application for sending and receiving short messages, a directory management application for managing database entries in the form of directories, a web browser application, and other various applications.

Service classes 4300 provide a generic set of application programming facilities shared by user applications 4200. Service classes 4300 preferably include various utilities and components, such as a Java telephony application interface, a voice and data manager, directory services, voice mail components, text/ink note components, e-mail components, fax components, network services management, and other miscellaneous components and utilities.

Java environment 4400 preferably includes a JVM and the necessary run-time libraries for executing applications written in the Java™ programming language.

RTOS utilities 4500 provide real time tasks, low level interfaces, and native implementations to support Java environment 4400. RTOS utilities 4500 preferably include Java peers, such as networking peers and Java telephony peers, optimized engines requiring detailed real time control and high performance, such as recognition engines and speech processing, and standard utilities, such as protocol stacks, memory managers, and database packages.

Device drivers 4600 provide access to the hardware elements of mobile telephone 1100. Device drivers 4600 include, for example, drivers for sliding keypad 3500 and display module 3700.

Figure 5:
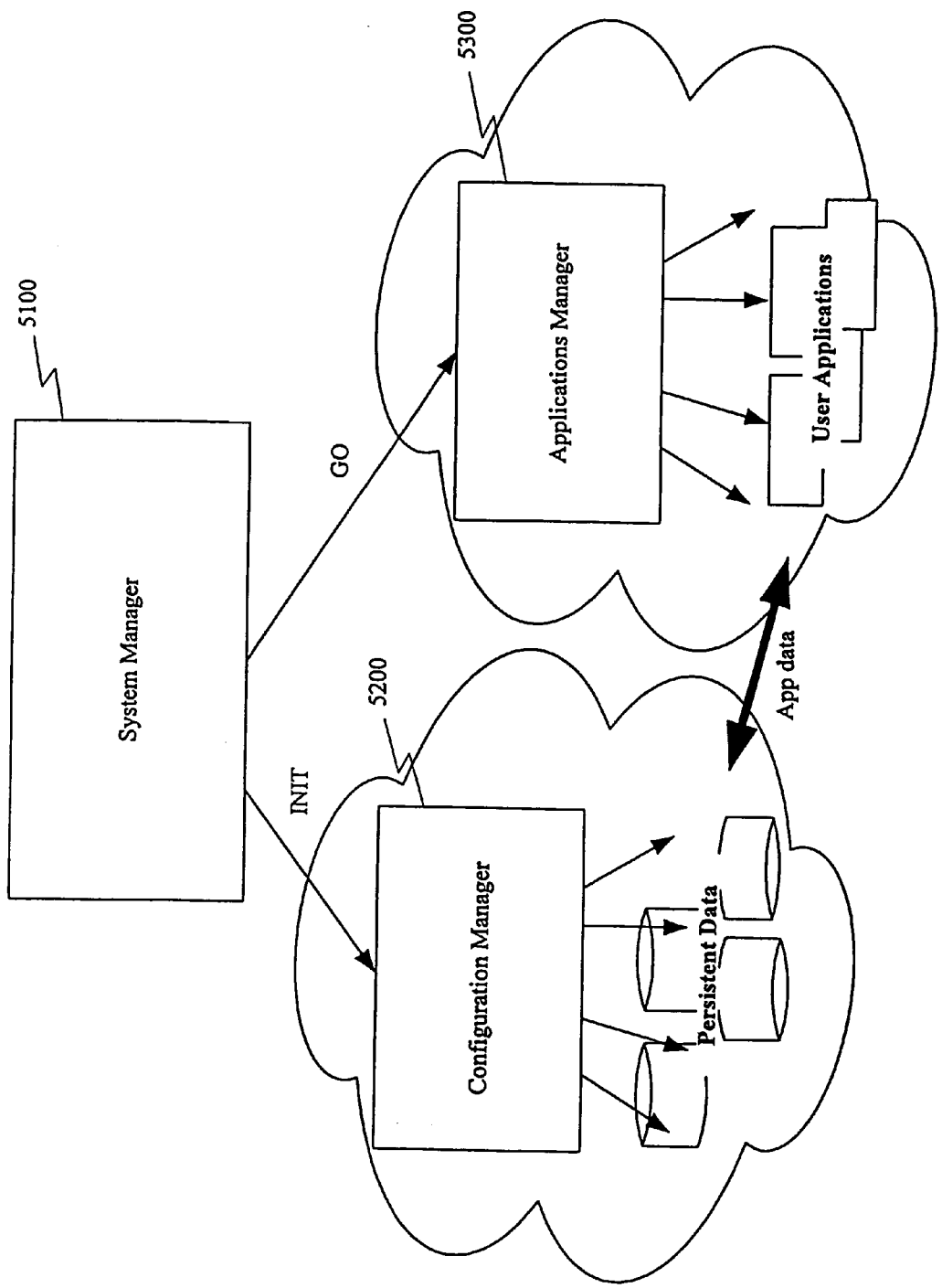
FIG. 5 is a block diagram of the graphical user interface manager of FIG. 4.

Feature processor 3300 executes the program code of flash ROM 3440 to provide the user friendly interface. GUI manager 4100 controls the user friendly interface to provide a multitasking environment. FIG. 5 is a block diagram of GUI manager 4100, including system manager 5100, configuration manager 5200, and applications manager 5300.

System manager 5100 acts as a top level manager. System manager 5100 controls system startup, including the boot-up sequence and persistent object instantiations, sanity checks, global error/exception handling, and global utility functions, such as power and audio management.

Configuration manager 5200 handles the data management for the system. Configuration manager 5200 processes the user preference data, directories, and saved user applications, pages, and applets. Configuration manager 5200 performs cache management, backup and restore operations, and version control.

Applications manager 5300 manages user applications 4200. Applications manager 5300 handles the starting and stopping of user visible applications, display access, and window management. Applications manager 5300 provides a common application framework, application and applet security, and class management.

System manager 5100, configuration manager 5200, and applications manager 5300 work together within the framework of GUI manager 4100 to provide the multitasking environment to allow the user to select, run, and manage user applications 4200 concurrently. GUI manager 4100 provides a graphical user interface on display 2400 (FIG. 2) from which the user can choose a user application to run.

II. System Processing.

Figure 6:
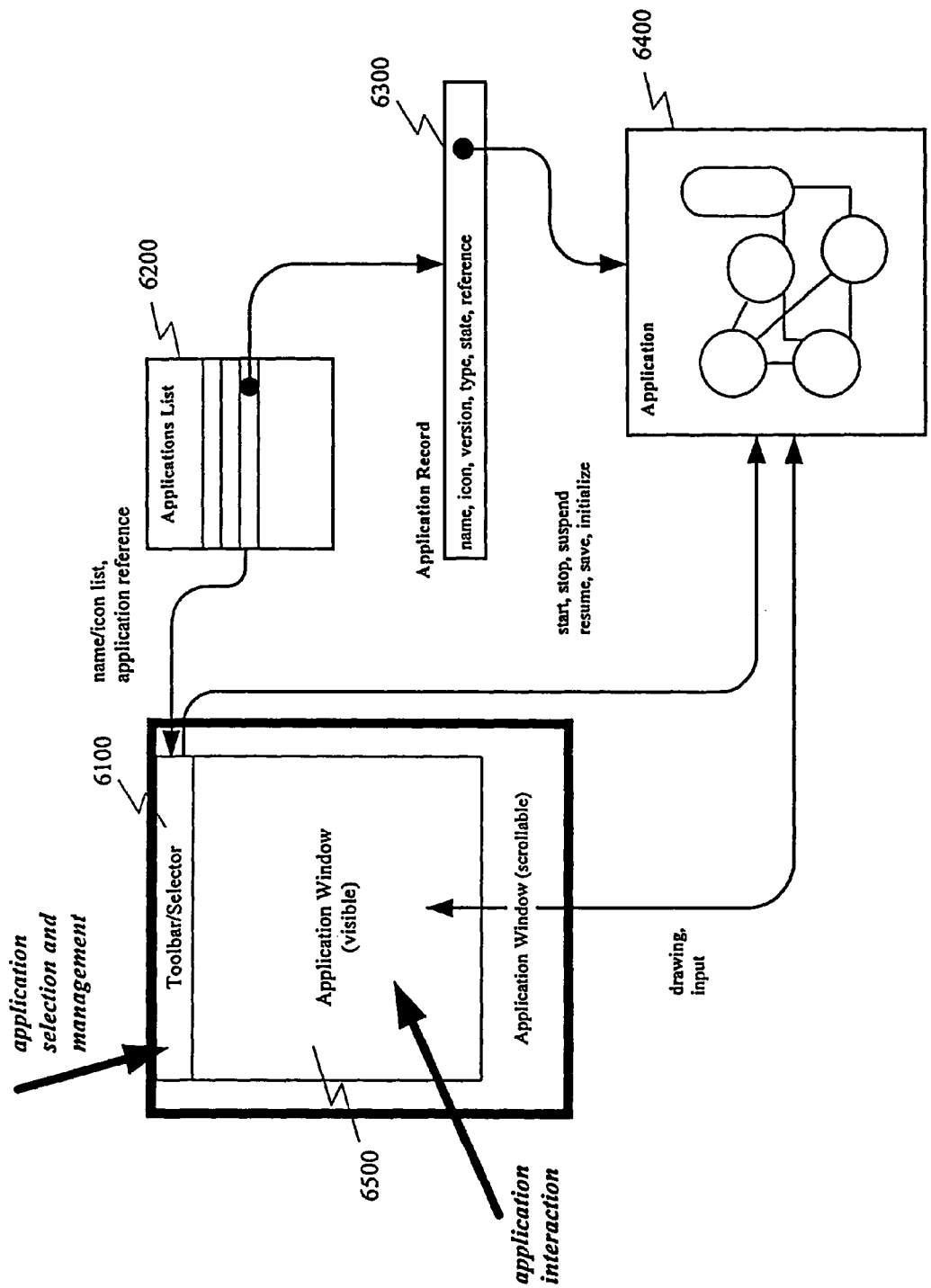
FIG. 6 is a block diagram demonstrating the information flow handled by the graphical user interface manager.

FIG. 6 is a block diagram demonstrating how the information flow might be handled by GUI manager 4100. GUI manager 4100 provides Toolbar/Selector 6100 from which the user chooses a user application to run. Application list 6200, managed by configuration manager 5200, contains a list of the user applications. Configuration manager 5200 stores an application record 6300 for each user application in application list 6200. Application record 6300 stores various descriptive information regarding the user application, including name, icon, version, type, state, and reference data.

When the user selects a user application to run, such as application 6400, GUI manager 4100 passes exclusive control of application window 6500 and other user interface resources to application 6400. GUI manager 4100 continues to manage application 6400 to suspend, resume, or stop it in response to user commands or another higher priority running application.

Figure 7:
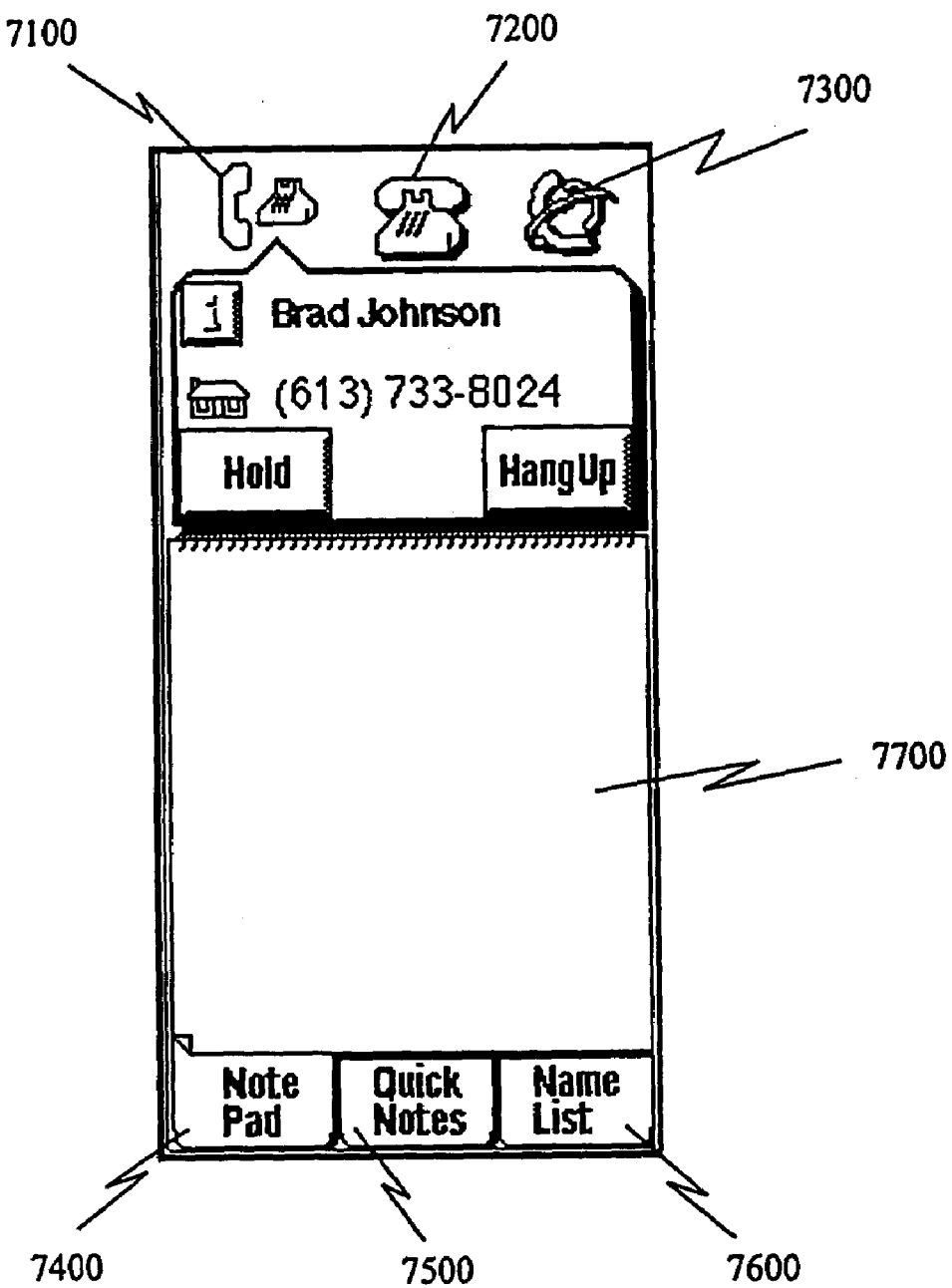
FIG. 7 is a multitasking graphical user interface display.

By virtue of such an arrangement, mobile telephone 1100 provides a multitasking graphical user interface to the user. FIG. 7 is a GUI display by which GUI manager 4100 presents the major communication tasks, such as voice calls, SMS notes, business cards, and voice mail messages, as objects. The user can act on these objects in any order. For example, the GUI manager 4100 allows the user to initiate or maintain a voice call while composing or sending an SMS note to the called party or a third party, or while receiving or replying to an SMS note from the called party or a third party.

FIG. 7 is an example of a GUI display where GUI manager 4100 provides the user with access to the major communication task objects from all main functional areas. The major communication task objects provided by GUI manager 4100 preferably include telephone icons 7100 and 7200, message center icon 7300, Note Pad button 7400, Quick Notes button 7500, and Name List button 7600.

By simply pressing one of the major communication task objects while the user maintains a voice call with a called party, as evidenced by off-hook telephone icon 7100, the user can: (1) compose an SMS note by pressing Note Pad button 7400 or by simply touching note area 7700; (2) place a second call by pressing on-hook telephone icon 7200, terminating the call or putting the call with the called party on hold, and then placing the second call; (3) receive and answer a second call by pressing on-hook telephone icon 7200, terminating the call with the called party or putting the call with the called party on hold, and then answering the second call; (4) view information regarding received voice mail, faxes, SMS messages, etc., by pressing message center icon 7300; (5) edit or send a previously stored SMS note by pressing Quick Notes 7500; or (6) access a list of names stored as business cards by pressing Name List button 7600. GUI manager 4100 provides the user with similar options while the user composes and sends an SMS note.

In addition to these features, GUI manager 4100 performs many activities transparent to the user, while the user maintains a voice call or composes an SMS note. Some of these activities include automatically capturing and storing calling line identification (CLID) data or unstructured supplementary service data (USSD) in business cards. Other activities include the non-exclusive notification of incoming communication to allow the user to evaluate the impact of an action on the current activity, that is, whether to continue the current activity and ignore the incoming communication, terminate the current activity and accept the incoming communication, or continue the current activity and accept the incoming communication.

Figure 8A:
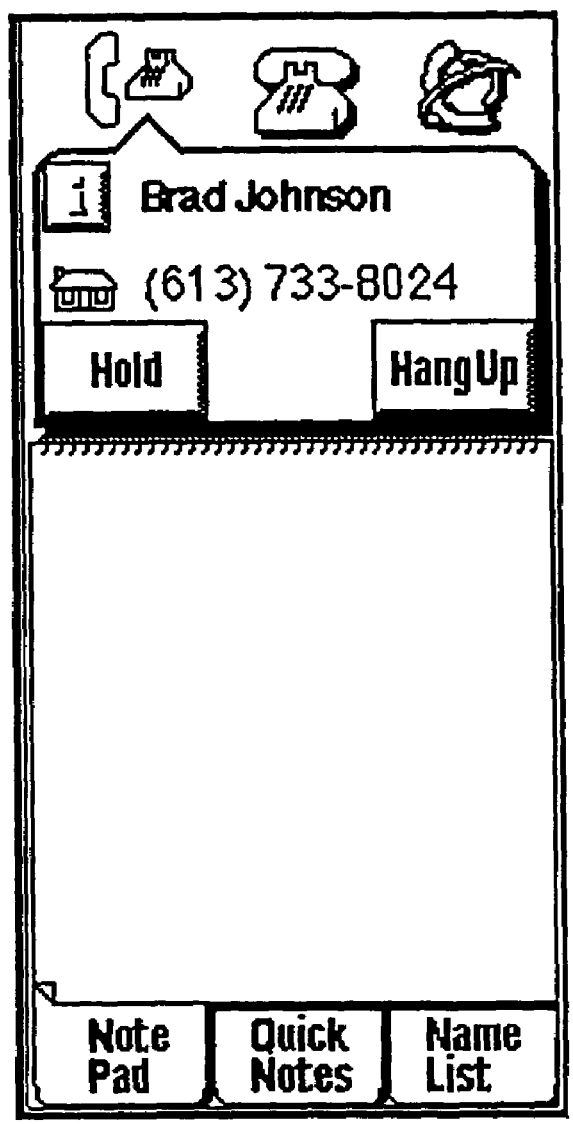
FIGS. 8A through 8E are sample screens when operating a method consistent with the present invention.
Figure 8B:
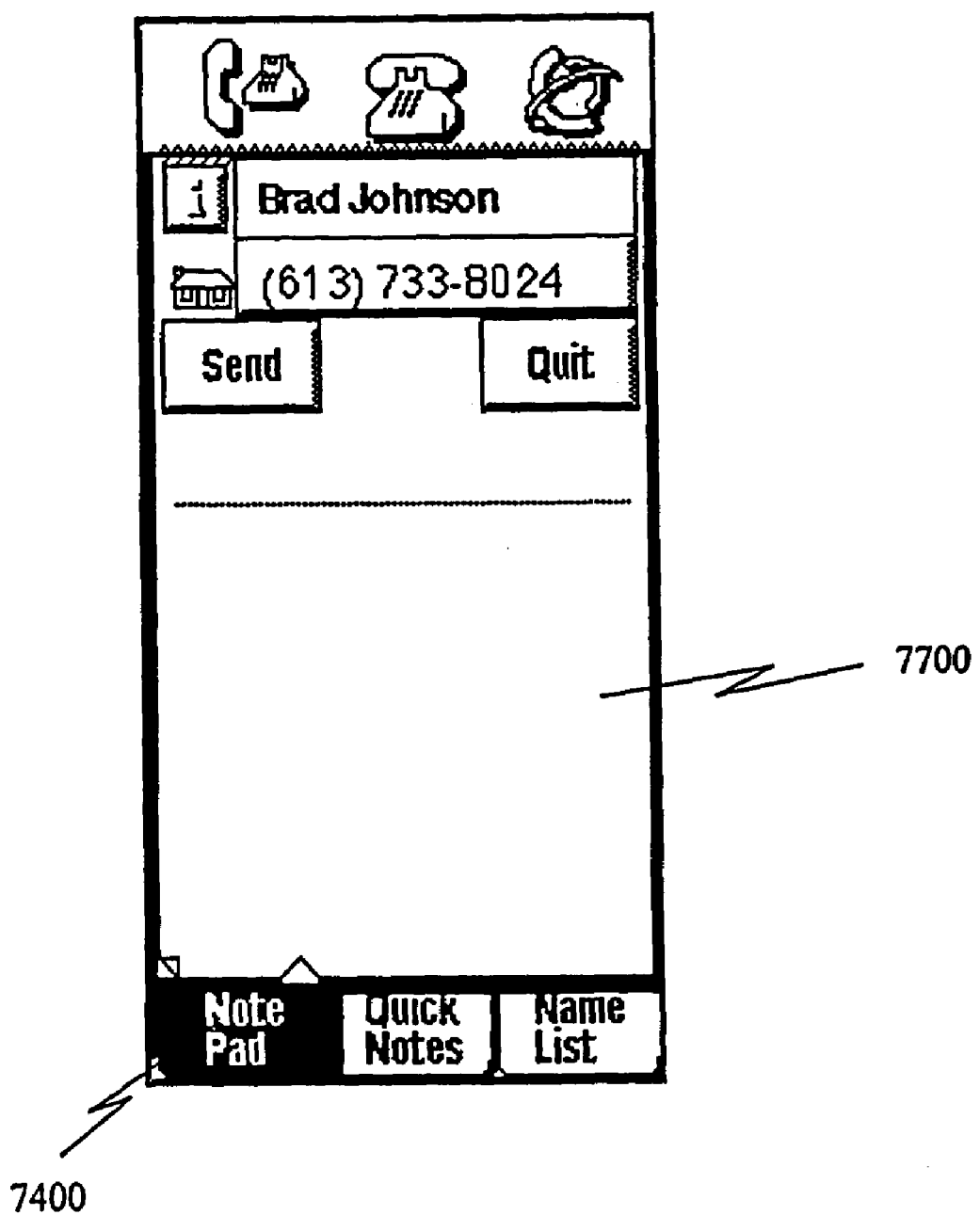

FIGS. 8A through 8E are sample displays shown when the user sends an SMS note to a called party while maintaining a voice call with the called party. FIG. 8A shows the user engaged in a voice call with the called party. In FIG. 8B, the user either presses Note Pad button 7400 or touches note area 7700, thereby automatically setting up an SMS note pre-addressed to the called party. At this point, the user can construct the SMS note. The SMS note may be one of three types: an SMS text message, an SMS ink message, or an SMS text message with hypertext markup language (HTML) code.

Figure 8C:
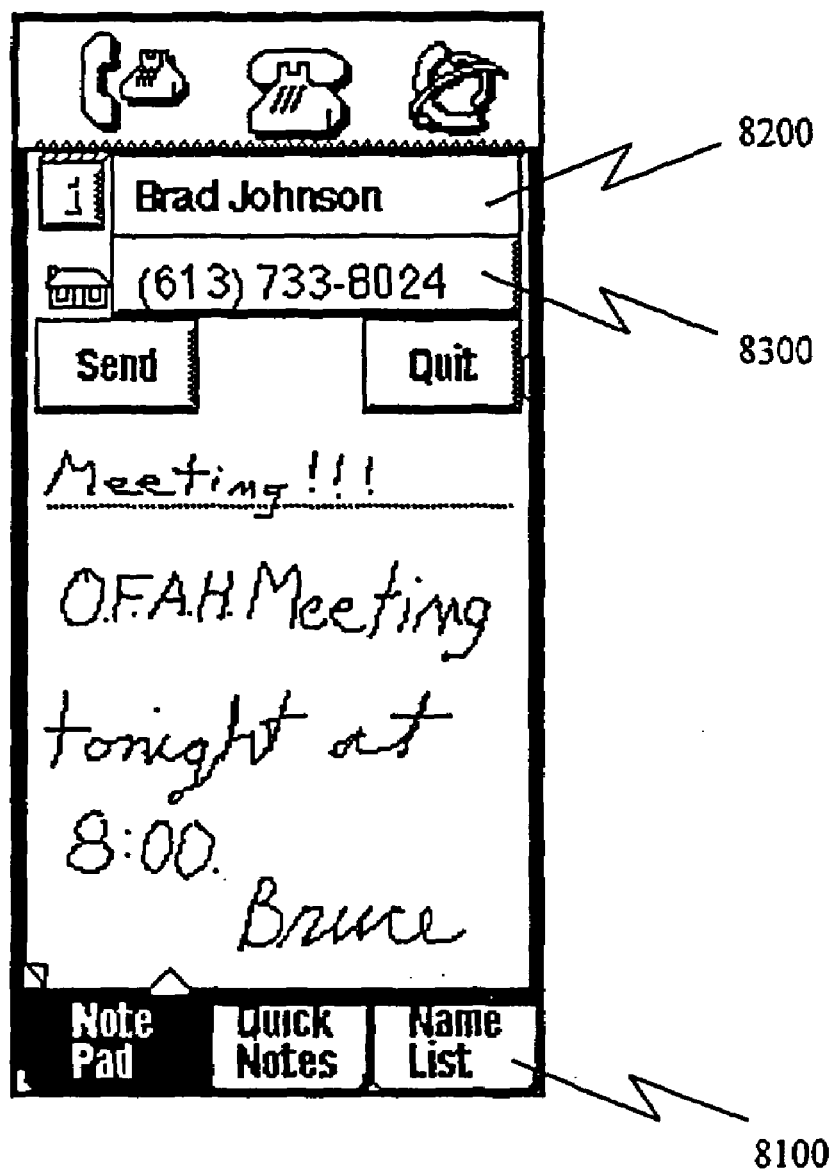

FIG. 8C shows the case in which the user composes an SMS ink message. At any time before sending the SMS note, the user can change its destination address from the address of the called party to an address of a third party. To address the note to the third party, the user either presses Name List 8100, which displays the stored business cards from which the user can select the recipient, presses the called party's name 8200, which also displays the stored business cards, or presses the telephone number 8300, which brings up a cursor to allow the user to change the telephone number of the recipient.

Figure 8D:
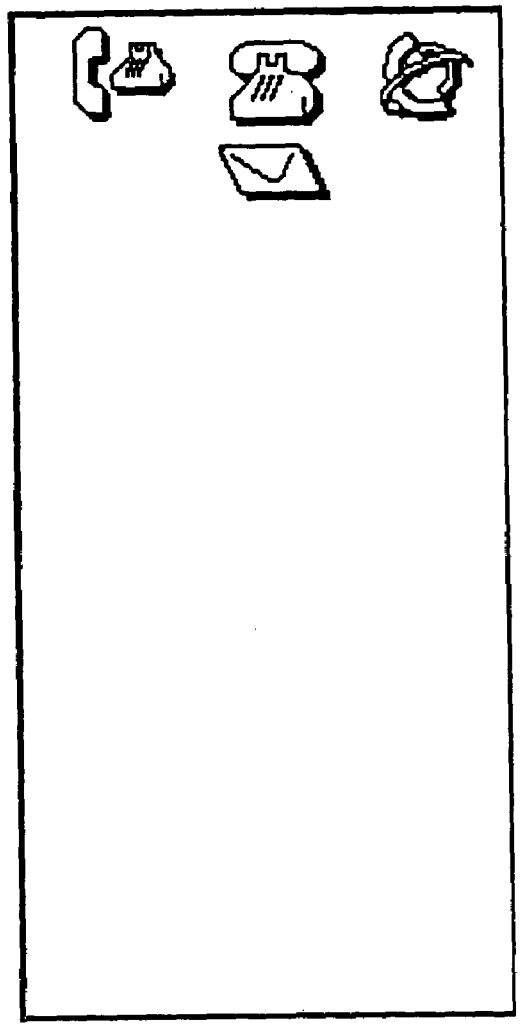
Figure 8E:
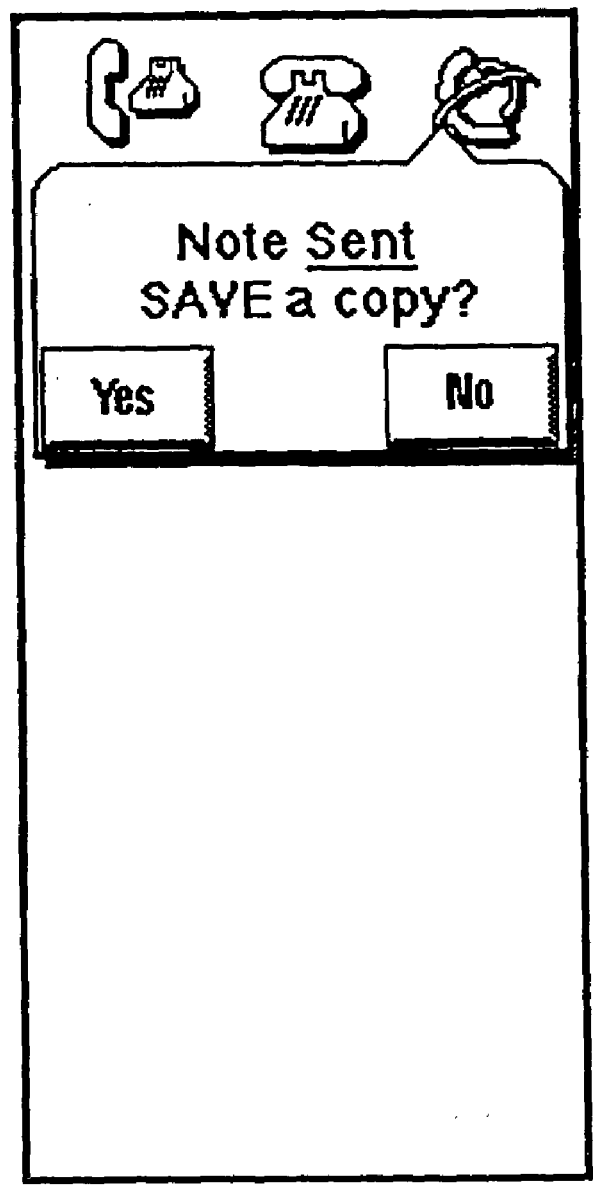

Once the user constructs the SMS note and selects the proper destination address, the user presses the Send button. FIG. 8D shows display 2400 after the user presses the Send button to transmit the SMS note. FIG. 8E shows that once the SMS note has been sent, message center icon 7300 requests whether the SMS note should be saved. The user can save the SMS note by pressing the Yes button. Once the user makes a decision-whether to save the SMS note, display 2400 returns to that shown in FIG. 8A.

III. Conclusion.

The multitasking graphical user interface consistent with the principles of the present invention provides a simple interaction model by which a user can select and operate multiple communication tasks concurrently.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, a mobile telephone has been described as providing the multitasking graphical user interface. However, this need not be the case. The multitasking graphical user interface could be provided by a desk-top type unit or a personal computer.

Additionally, the foregoing description detailed specific graphical user interface displays, containing various graphical icons and buttons. These displays have been provided as examples only. The foregoing description encompasses obvious modifications to the described graphical user interface displays. The scope of the invention is defined by the claims and their equivalents.

What is claimed is:

1. A telecommunications device for permitting a user to perform a plurality of communication-related tasks concurrently within the telecommunications device comprising:
   a user input device;
   a display having a tools portion and a windows portion; and
   a processing element, connected to the user input device and the display, wherein the processing element is configured to communicate with a wireless voice network, to represent the communication-related tasks as objects in the tools portion, to provide the user with simultaneous access to the plurality of communications-related tasks, to execute different ones of the communication-related tasks based upon selection of corresponding ones of the communication-related task objects by the user via the user input device, and to change the window portion based on the user selection without changing the tools portion.

2. The telecommunications device of claim 1, wherein the user input device is a touch screen element on the display, and wherein the processing element executes one of the communication-related tasks based on the user touching a corresponding one of the communication-related task objects on the touch screen element.

3. The telecommunications device of claim 1, wherein the processing element executes a plurality of the communication-related tasks concurrently when a corresponding plurality of the communication-related task objects are selected by the user.

4. The telecommunications device of claim 3, wherein the processing element sends and receives voice calls and notes.

5. The telecommunication device of claim 3, further comprising:
   means for managing the plurality of communication-related tasks to suspend, resume, or stop at least one of the plurality of communication-related communication related tasks.

6. The telecommunications device of claim 1, wherein the processing element partitions the display into the window portion and the tools portion.

7. The telecommunications device of claim 1, wherein the processing element provides access to the communication-related task objects in the tools portion regardless of the user selection.

8. The telecommunications device of claim 1, wherein the telecommunications device is a mobile telephone.

9. The telecommunications device of claim 8, wherein the mobile telephone includes a GSM mobile telephone.

10. A graphical user interface manager for controlling a telecommunications device display, having a window portion and a tools portion, to permit a user to perform a plurality of communication-related tasks concurrently, comprising:
    a display controller for representing the communication-related tasks as objects in the tools portion and for providing the user with simultaneous access to the plurality of communication-related tasks;
    a first processor element for launching different ones of the communication-related tasks to communicate with the wireless voice network based upon selection of corresponding ones of the communication-related task objects by the user; and
    second processor element for changing the window portion based on the user selection without changing the tools portion.

11. The graphical user interface manager of claim 10, wherein the telecommunications device display includes a touch screen display, and wherein the first processor element comprises:
    a third processor element for executing one of the communication-related tasks based on the user touching a corresponding one of the communication-related task objects on the touch screen display.

12. The graphical user interface manager of claim 10, wherein the first processor element comprises:
    means for executing a plurality of the communication-related tasks concurrently when a corresponding plurality of the communication-related task objects are selected by the user.

13. The graphical user interface manager of claim 12, wherein the executing means includes means for sending and receiving voice calls and sending and receiving notes.

14. The graphical user interface manager of the claim 10, further including a fourth processor element for partitioning the telecommunications device display into the window portion and the tools portion.

15. The graphical user interface manager of claim 10, wherein the second processor element includes means for providing access to the communication related task objects in the tools portion regardless of the user selection.

16. A method of controlling a telecommunications device display, having a window portion and a tools portion, comprising:
   representing a plurality of communication-related tasks as objects in the tools portion;
   providing a user with simultaneous access to the plurality of communication-related tasks;
   executing code on one or more processors to launch different ones of the communication-related tasks based upon selection of corresponding ones of the communication-related task objects by the user;
   changing the window portion based on the user selection; and
   maintaining the tools portion unchanged regardless of the user selection.

17. The method of claim 16, wherein the telecommunications device display is a touch screen display, and wherein launching includes executing one of the communication-related tasks based on the user touching a corresponding one of the communication-related task objects on the touch screen display.

18. The method of claim 16, wherein launching includes executing a plurality of the communication-related tasks concurrently when a corresponding plurality of the communication-related task objects are selected by the user.

19. A method of concurrently performing tasks on a telecommunications device configured to communicate with a wireless voice network, the device including a display screen displaying a plurality of task objects corresponding to the tasks, comprising:
   receiving a first user selection signal, the first user selection signal representing a selection by a user of a first one of the task objects;
   executing a first one of the plurality of communication tasks corresponding to the selected first task object;
   providing the user with simultaneous access to the plurality of task objects;
   receiving a second user selection signal while executing the first task, the second user selection signal representing a selection of a second one of the task objects by the user; and
   executing a second one of the tasks corresponding to the selected second task object while continuing to execute the first task.

20. The method of claim 19, wherein the first task object is a voice call object for establishing a voice call, and wherein the first task comprises:
   opening a voice call window on the display screen,
   entering an identity of a recipient of the voice call, and
   establishing the voice call with the voice call recipient.

21. The method of claim 20, wherein the second task object is a note object for sending a note, and wherein executing the second task comprises:
   opening a note window on the display screen,
   entering note text for the note, the note being pre-addressed to the voice call recipient, and
   sending the note.

22. The method of claim 21, wherein executing the second task comprises changing a recipient of the note to identify a recipient other than the voice call recipient.

23. The method of claim 20, wherein the second task object is a voice call object, and wherein executing the second task comprises:
   opening a voice call window on the display screen,
   entering an identity of another voice call recipient, and
   establishing the voice call with the another voice call recipient.

24. The method of claim 23, wherein executing the second task further comprises:
   prompting the user to select either to place the voice call recipient on hold or to terminate the voice call with the voice call recipient, and
   receiving a selection signal from the user.

25. The method of claim 19, wherein the first task object is a note object for sending a note, and wherein executing the first task comprises:
   opening a note window on the display screen,
   entering note text and an identity of a note recipient, and
   sending the note to the note recipient.

26. The method of claim 25, wherein the second task object is a voice call object for establishing a voice call, and wherein executing the second task comprises:
   opening a voice call window on the display screen,
   entering an identity of a recipient of the voice call, and
   establishing the voice call with the voice call recipient.

27. The method of claim 25, wherein receiving the second user selection signal comprises:
   receiving a voice call from a caller,
   opening a voice call window informing the user of an identity of the caller, and
   receiving the second user selection signal in response to the received voice call, the second user selection signal being an indication of an acceptance or a denial of the received voice call.

28. The method of claim 27, wherein executing the second task comprises:
   permitting the user to converse with the caller when the second user selection signal indicates an acceptance.

29. The method of claim 19, wherein receiving the first user selection signal comprises:
   receiving a voice call from a caller,
   opening a voice call window informing the user of an identity of the caller, and
   receiving the first user selection signal in response to the received voice call, the first user selection signal being an indication of an acceptance or a denial of the received voice call.

30. The method of claim 29, wherein executing the first task comprises:
   permitting the user to converse with the caller when the first user selection signal indicates an acceptance.

31. The method of claim 30, wherein receiving the second user selection signal comprises:
   receiving a second voice call from a second caller,
   opening a voice call window informing the user of an identity of the second caller, and
   receiving the second user selection signal in response to the received second voice call, the second user selection signal being an indication of an acceptance or a denial of the received second voice call.

32. The method of claim 31, wherein executing the second task comprises:
   permitting the user to converse with the second caller when the second user selection signal indicates an acceptance.

* * * * *

UNITED STATES PATENT AND TRADEMARK OFFICE
CERTIFICATE OF CORRECTION

PATENT NO. : 7,222,304 B2  
APPLICATION NO. : 10/629558  
DATED : May 22, 2007  
INVENTOR(S) : Brian Finlay Beaton It is certified that error appears in the above-identified patent and that said Letters Patent is hereby corrected as shown below:

Title Page, Column 1, item (63), before (51) Int. Cl., insert

-- Related U.S. Application Data  
Continuation of Application No. 08/842,015, filed on April 23, 1997, now Patent No. 6,608,637 --

Signed and Sealed this  
Fifth Day of March, 2013

Teresa Stanek Rea  
*Acting Director of the United States Patent and Trademark Office*